United States Patent [19]
Rich

[11] Patent Number: 4,562,445

[45] Date of Patent: Dec. 31, 1985

[54] APPARATUS AND METHOD FOR DRIVING INK JET PRINTER

[75] Inventor: Leonard G. Rich, West Hartford, Conn.

[73] Assignee: Metromedia, Inc., Secaucus, N.J.

[21] Appl. No.: 634,499

[22] Filed: Jul. 26, 1984

[51] Int. Cl.[4] .......... G01D 15/16

[52] U.S. Cl. .......... 346/140 R; 346/75

[58] Field of Search .......... 346/140 R, 75, 1.1

[56] References Cited

U.S. PATENT DOCUMENTS

| | | | |
|---|---|---|---|
| 4,072,958 | 2/1978 | Hayami | 346/140 |
| 4,312,007 | 1/1982 | Winfield | 346/140 |
| 4,499,479 | 2/1985 | Lee | 346/140 |

*Primary Examiner*—Joseph W. Hartary

*Attorney, Agent, or Firm*—McCormick, Paulding & Huber

[57] ABSTRACT

A circuit and related method are provided for driving an ink jet printer to achieve a consistent velocity of ejected ink drop despite differences in the time elapsing between successive drops. Timing pulses timing the ejection of drops each trigger the production of a fundamental waveform. This waveform is then multiplied by a multiplying factor selected from a look-up table in response to the time elapsing between the timing pulse causing the generation of the waveform and the preceding timing pulse, and the modified waveform so produced is used to drive the printing head through a power amplifier. The multiplying factor is one chosen by experiment as that required to produce the desired ink jet velocity. In a preferred embodiment both the fundamental waveform and the multiplying factor may each be obtained through the use of an associated PROM so that the waveform shape and multiplying factor versus dot frequency characteristic may be readily changed to suit the particular printer head in question.

14 Claims, 4 Drawing Figures

APPARATUS AND METHOD FOR DRIVING INK JET PRINTER

BACKGROUND OF THE INVENTION

This invention relates to ink jet printers and deals more particularly with an improved apparatus or circuit and related method for driving an ink jet printer head having an electrically energizable activating element such as a piezoelectric one.

In an ink jet printer a receiving surface on which a graphic is to be created is moved relative to one or more ink jet printer heads in a line scanning fashion. As each printer head moves along a scan line it moves past a succession of points on the line in relation to each of which the printer head may eject a drop which lands on and prints a dot at the position. In one type of printer head the head is actuated for each potential print point on the scan line, to eject a drop of ink for each such position, and then the drop is electrostatically controlled during its flight from the printer head to the receiving surface to either direct it onto the receiving surface or away from the receiving surface depending on whether the scan line point in question is to be printed or not. In such a printer head the actuation frequency, or the time between successive actuations, is dependent on the speed of the printer head along the scan line. That is, the actuation frequency, or the time between successive actuations, will change if changes are made in the speed of the printer head relative to the receiving surface.

In another type of printer head, referred to as a "drop-on-demand" printer head, as the printer head is moved along a scan line it is actuated to produce a drop of ink only for those potential print positions along the scan line onto which printing is wanted. Therefore, the amount of time elapsing between successive actuations is dependent not only on the speed of the printer head relative to the receiving surface but also on the pattern in accordance to which dots are to be printed along the scan line.

In either type of printer head described above, after a drop is ejected from the head it travels for some distance in free flight from the printer head to the receiving surface along a trajectory path dependent on the velocity at which the drop is ejected. Changes in the ejected velocity therefore change the location at which a drop strikes the receiving surface and are quite undesirable. Also, for good printing all ejected drops should be of substantially the same volume so that all dots printed on the receiving surface by the separate drops are of substantially consistent size.

Because of fluid and mechanical dynamics involved in the actuation of a printer head, including resonances and other phenomena, the ejected drop velocity, and also to some extent the drop volume, varies widely in many printer heads with changes in the actuation frequency or the time elapsing between successive actuations. This may be somewhat troublesome in the use of electrostatically deflected printer heads in cases where the printer head is moved at different speeds relative to the receiving surface. It is, however, particularly troublesome in the case of drop-on-demand printer heads in which the inherent operation of the printer involves a wide range in the elapsed time occurring between successive pulses. That is, while scanning a line during one portion of the line the printer head may be actuated to print a dot at every potential print point in which case a very short elapsed time occurs between successive actuations, and along other portions of the line the printer head may be actuated to print a dot only at some occasional potential print points in which case the time elapsing between successive actuations is considerably lengthened.

The purpose of the invention is therefore to provide a driving circuit for an ink jet printer head, particularly useful with drop-on-demand printer heads, but also useful with electrostatically deflected heads, for causing the printer head to eject drops at a constant velocity, and of substantially constant size, despite changes in the time elapsing between successive actuations.

A further object of the invention is to provide a circuit of the foregoing type which may be readily adjusted to suit the particular printer head with which it is to be used.

Other objects and advantages of the invention will be apparent from the following description and claims taken in conjunction with the accompanying drawings.

SUMMARY OF THE INVENTION

The invention resides in a circuit and related method for driving an ink jet printer head in response to timing pulses from a controller or other device in which circuit each timing pulse triggers the generation of a fundamental waveform of fixed shape. The circuit also measures the time elapsing between each timing pulse and the preceding timing pulse, and this measurement is used to extract a related multiplying factor from memory. The fundamental waveform is then multiplied by the multiplying factor to create a waveform of modified amplitude utilized to excite the printer head.

The invention more specifically resides in the means for creating the fundamental waveform in response to each timing pulse being a PROM addressed by a counter and feeding a digital to analog converter so that the shape of the fundamental waveform can readily be changed by reprogramming the PROM.

The invention also specifically resides in the means for providing the multiplying factor being a PROM addressed by a counter and feeding a digital to analog converter so that the multiplying factor versus elapsed time characteristic may be readily varied by reprogramming the PROM.

DETAILED DESCRIPTION

The ink jet printer head driving circuit of the invention may be applied to a printer head forming part of any one of a wide variety of ink jet printers. The printer head may, for example, be the only printer head of the printer or it may be one of a plurality of printer heads included in the printer with various ones of the heads ejecting drops of different color to produce colored graphics. Also, the size of the printer head and of the entire printer may vary widely as may the method used for achieving relative scanning movement between the printer head or heads and the receiving surface.

Figure 1:
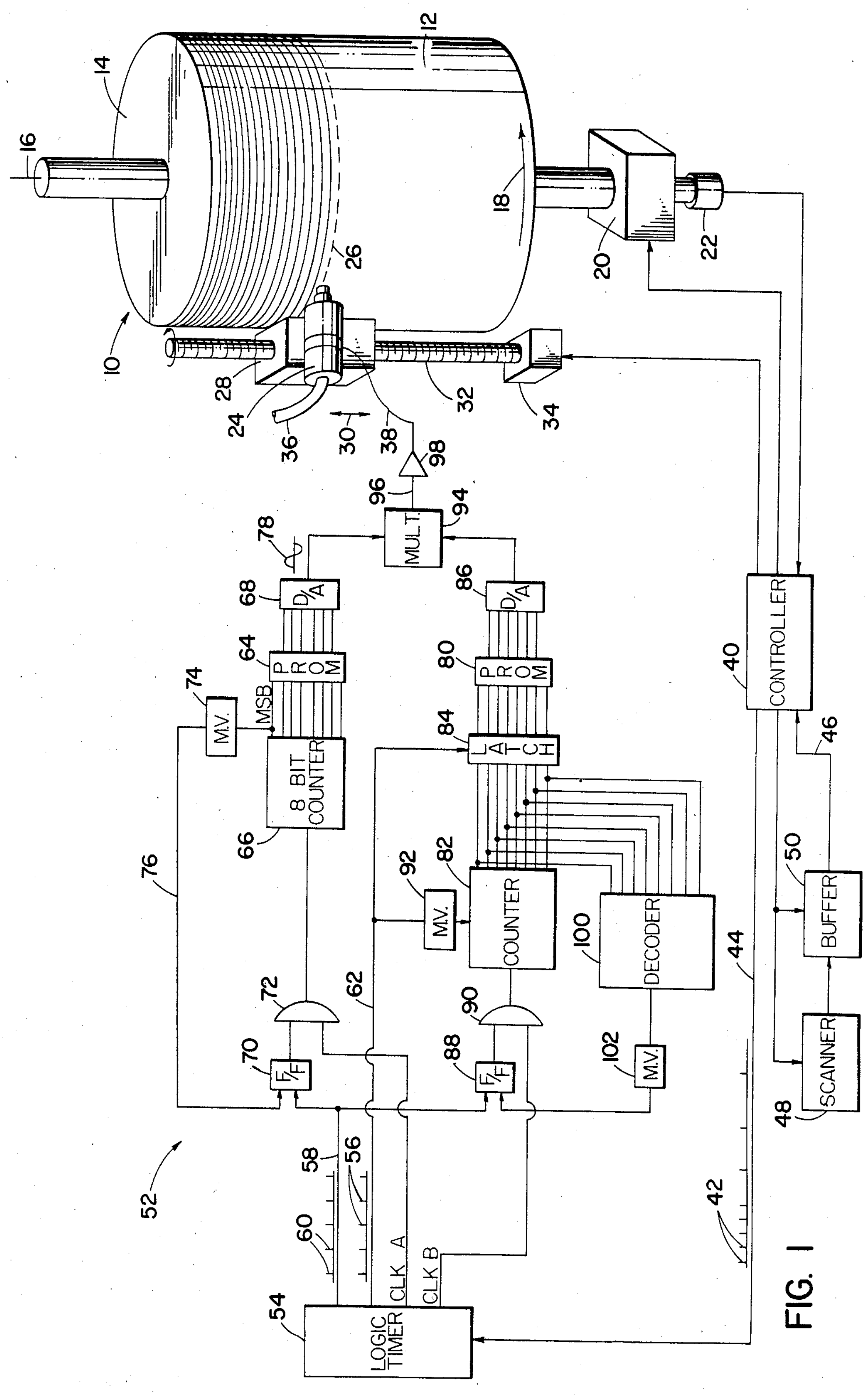
FIG. 1 is a schematic diagram showing an ink printer having a printer head driving circuit embodying this invention.

By way of example, FIG. 1 shows an ink jet printer, indicated generally at 10, wherein the receiving surface 12 is located on the outside of a cylindrical drum 14 supported for rotation about a vertical axis 16. The drum is driven in rotation, in the direction indicated by the arrow 18, about the vertical axis 16 by a drive motor 20 and the angular position of the drum with respect to the axis 16 is detected by an encoder 22. An ink jet printer head 24 is positioned to eject ink drops onto the receiving surface 12. As the drum 14 is rotated the printer head is moved slowly downwardly so that with each revolution of the drum the printer head scans a new line 26 on the receiving surface 12, each scan line actually being one convolution of a continuous helical line. To achieve this motion the printer head 24 is mounted on a carriage 28 driven in the vertical direction, indicated by the arrow 30, by a lead screw 32 rotated by a drive motor 34. Ink is supplied to the printer head through a tube 36 connected to a suitable reservoir (not shown) and electrical power for actuating the printer head is supplied to it through a set of electrical conductors 38, the conductors more particularly being connected to a piezoelectric activating element forming part of the printer head.

The construction of the printer head 24 may vary widely, but preferably and by way of example, the construction may be similar to that shown in the patent application filed concurrently herewith in the name of Leonard G. Rich entitled INK JET PRINTER HEAD, the disclosure of which application is incorporated herein by reference and to which application reference may be made for further details of the printer head, which printer head is one having a piezoelectric activating element and is intended to eject relatively large volume ink drops adapting it to use in relatively large printers for producing large scale graphics such as billboards and display signs.

In FIG. 1 the printer 10 is controlled by a controller 40 receiving signals from the encoder 22 and furnishing signals to the drive motors 20 and 34 creating and controlling the relative motion between the receiving surface 12 and the ink jet printer 24. The controller 40 is also responsive to input video signals or the like in response to which timing signals, such as indicated at 42, are output on the line 44. The timing signals 42 are very short duration pulses each of which dictates, as described hereinafter, one actuation of the ink jet printer head 24. The controller 40 generates the timing pulses in synchronism with the relative movement between the receiving surface 12 and the printer head 24 so that each time the printer head is moved to a new potential print position a timing pulse 42 is created or not depending on whether or not an ink dot is to be printed at that position. The time elapsing between successive timing pulses 42 may vary and the minimum amount of time between any two successive timing pulses is related to the maximum speed between the receiving surface 12 and the printer head and the spacing between the centers of successive potential print positions along the scan line, both of which may also vary. By way of example, in the system of FIG. 1 it is taken that the spacing between the centers of potential print positions along the scan line is such that at the maximum speed of the receiving surface relative to the printer head the printer head has to be actuated at a frequency of one kilohertz to print a dot at each potential print position, thereby making the minimum elapsed time between two successive timing pulses 42 one millisecond.

The video signal to which the controller 40 is responsive is in the illustrated case supplied to the controller through the line 46 and may come from various different sources, the illustrated source being an optical scanner 48 connected with the controller 40 through a buffer 50. The scanner 48 may be an optical laser scanner which scans a continuous tone negative mounted on a drum. At the beginning of each revolution of the drum 14 the scanner 48 is operated to rotate its drum at a faster rate than the drum 14 to scan one line on the associated negative, the information derived and relating to the one scan line being sent to the buffer which temporarily stores it in a push down list storing a number of lines of information. Also at the start of each revolution of the drum 14 the controller extracts information, that is the video signal, for a scan line from the bottom of the push down list of the buffer and uses that information to generate the timing signals 42, so that through the intermediary of the buffer 50 the printer 10 and scanner 48 operate simultaneously in an on-line fashion.

In accordance with the invention, a driving circuit, indicated generally at 52 in FIG. 1, is provided for actuating the printer head 24 in response to the timing pulses 42 so that ink drops of consistent velocity are ejected from the printer head 24 despite differences in the elapsed time between successive timing pulses. The circuit 52 is such that in response to each timing pulse 42 a fundamental waveform of fixed shape is produced which is then modified in amplitude by being multiplied by a multiplying factor chosen from a look-up table in which multiplying factors are related to elapsed time. The amplitude modified waveform so produced is then used to drive the printer head. Preferably the fundamental waveform is generated through the use of a PROM addressed by a counter and the multiplying factor versus elapsed time look-up table is also implemented by a PROM addressed by a counter which counts clock pulses to measure elapsed time. The particular arrangement and selection of circuit components and the manner of setting and resetting the counters and feeding clock pulses to them may vary considerably without departing from the invention.

In FIG. 1 the driving circuit 52 includes a logic timer 54 receiving the timing pulses 42 from the controller 40. the logic timer 54 produces a set of timing pulses 56 on the line 58 and another set of timing pulses 60 on the line 62. The pulses 56 appear in synchronism with input pulses 42—that is, they have the same elapsed time relationships between successive pulses 56 as between corresponding successive pulses 42. The timing pulses 60 also appear in corresponding relationship to the timing pulses 42 but are slightly delayed with respect to the timing pulses 56. The logic timer 54 also produces two clock signals referred to as CLK A and CLK B. CLK A is a "fast" clock and in the present instance is taken to have a frequency of 256 KHz. The CLK B is a "slow" clock and may in the present instance have a frequency of 4 KHz. The frequencies of CLK A and CLK B are taken to be fixed in the illustrated case. It should, however, be understood, that in keeping with the broader aspects of the invention CLK A may be made to be variable in frequency which variation, as will be understood from the following discussion, will have the effect of varying the period of the generated fundamental waveform, which variation of fundamental waveform period may be useful in certain applications.

For generating a fundamental waveform in response to each timing pulse 42 the driving circuit 52 includes a PROM 64 addressed by an eight bit counter 66 (that is, the address terminals of the PROM are connected to the data output terminals of the counter) and feeding a digital to analog converter 68. At the appearance of each timing pulse 60 on the line 58 an associated flip-flop 70 is set to enable the pulses of CLK A to pass through an AND gate 72 to the counter 66. The counter then counts through its full 256 count and when the end of this count is reached the transition which occurs on the most significant bit output line of the counter 66 triggers a one-shot multivibrator 74 to produce an output pulse on the line 76 which resets the flip-flop 70 thereby disabling the AND gate 72 so that no further CLK A pulses reach the counter 66 until the flip-flop 70 is toggled by the next appearing timing pulse 60.

The PROM 64 has 256 addresses at each of which a selected amplitude value is stored. Therefore, as the counter 66 is counted through its range of counts the PROM 64 successively outputs digital values on its output lines which define the amplitude values of the fundamental waveform and these digital values are converted to analog voltage values by the digital to analog converter 68 so that the output from the converter is a fundamental voltage waveform such as indicated at 78. Since the amplitude values stored at the different addresses of the PROM 68 may be varied the waveform 78 may be given any desired shape. For the particular printer head 24 with which the circuit 52 is used in FIG. 1 the prefered shape of the waveform 78 is that of a sine wave and the waveform 78 is illustrated as such. However, when the circuit 52 is used with other printer heads experimentation may show that fundamental waveforms other than sine waves may produce better results and if so the PROM 64 is readily programmable to achieve such different waveforms.

To produce a multiplying factor for each generated fundamental waveform, the circuit 52 of FIG. 1 includes another PROM 80 addressed by a counter 82, through a latch 84, and feeding a digital to analog converter 86. Upon the appearance of each timing pulse 60 on the line 58 a flip-flop 88 is set to enable an AND gate 90 to pass the pulses of CLK B to the counter 82. The counter 82 counts these pulses until it is reset by the next timing pulse or until a given preset count is reached, whichever occurs first. In either case resetting occurs upon the appearance of the next timing pulse. More particularly, the resetting is actually performed by the timing pulse 56 associated with the next appearing pulse 60 and which appears slightly in advance of the pulse 60. Therefore, when the timing pulse 56 appears on the line 62 it triggers a one-shot multivibrator 92 to reset the counter 82 and to also transfer the count of the counter, just before resetting occurs, to the latch 84. The count obtained by the latch 84 therefore is directly related to the elapsed time between the trigger pulse which reset the latch and the preceding one, assuming the clock did not reach its preset maximum count. The PROM 80 stores, as a look-up list, a plurality of multiplying factors each associated with a respective one of the possible counts of the counter and the value of the mulitplying factor stored at the address addressed by the latch 84 therefore appears at the output of the PROM and is converted to an analog voltage by the digital to analog converter 56. Due to the slight time offset between the timing pulses 56 and 60 the multiplying factor in the form of an analog voltage is available at the output of the converter 86 at the time the generation of a waveform 78 by the converter 68 begins and remains there during the full time the waveform 78 is generated. Therefore, as the fundamental waveform 78 is generated by the converter 68 it is multiplied by the multiplying factor from the converter 68 through an associated multiplier 94, the output of the multiplier 94 therefore being a waveform of modified amplitude appearing on the line 96 which is used to drive the printer head 24 through a power amplifier 98. Although in FIG. 1 the multiplier 94 for clarity is shown as a separate component, it and the digital to analog converter 64 conveniently may be parts of a multiplying digital to analog converter unit.

If a very long time elapses between successive timing pulses the counter 82 might, if not restrained, overrun its maximum count and begin a new counting sequence causing the count supplied to the latch 84 upon the appearance of the next timing pulse to be misleading. To avoid this, as mentioned above, the counter 82 is controlled so as to stop counting and to hold such count after a preset given count is reached. For this purpose a decoder 100 is connected to the output terminals of the counter 82 and produces an output signal when the preset count is reached which signal triggers a one-shot multivibrator 102 producing a pulse resetting the flip-flop 88 and thereby turning off the AND gate 90 to prevent further clock pulses from CLK B to reach the counter 82. As a result of this, whenever the time between successive timing pulses exceeds a given value the same number will be supplied to the latch 84 and the same output obtained from the PROM 80. In other words, when the printer head 54 is actuated below some given low frequency each fundamental waveform 78 produced will be multiplied by the same multiplication factor and for each actuation the printer head will be similarly energized.

Figure 2:
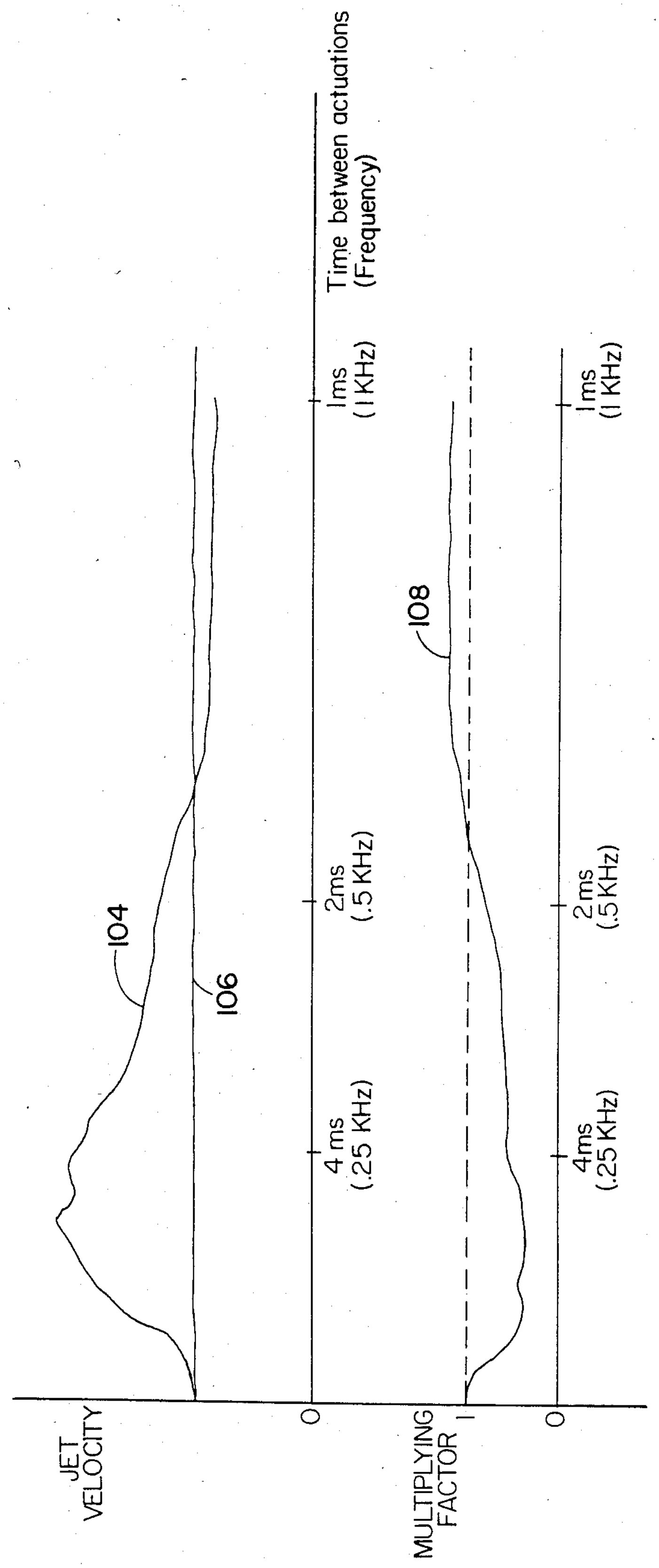
FIG. 2 is a diagram showing a representative relationship between ink drop velocity and actuation frequency and between multiplying factor and actuation frequency.

The results of the circuit 52 of FIG. 1 may be explained by reference to FIGS. 2 and 3. In FIG. 2 the line 104 represents a typical characteristic curve showing the performance of an ink jet printer head at different elapsed times between successive actuations (or at different actuation frequencies) in which case the actuating pulses are all of the amplitude. From this curve 104 it can be seen that the velocity of the ejected drop varies considerably with elapsed time between actuations. A desirable response characteristic is represented by the straight line 106 and is the type of performance achieved using the driving circuit of this invention. That is, in the case of the characteristic line 106 the velocity of the ejected ink drops remains constant over the full range of elapsed times between successive pulses (or actuating frequencies).

The line 108 of FIG. 2 shows the values of the multiplying factor stored in the PROM 80 and used to convert the performance characteristic of the printer head from the characteristic line 104 to the line 106.

Figure 3:
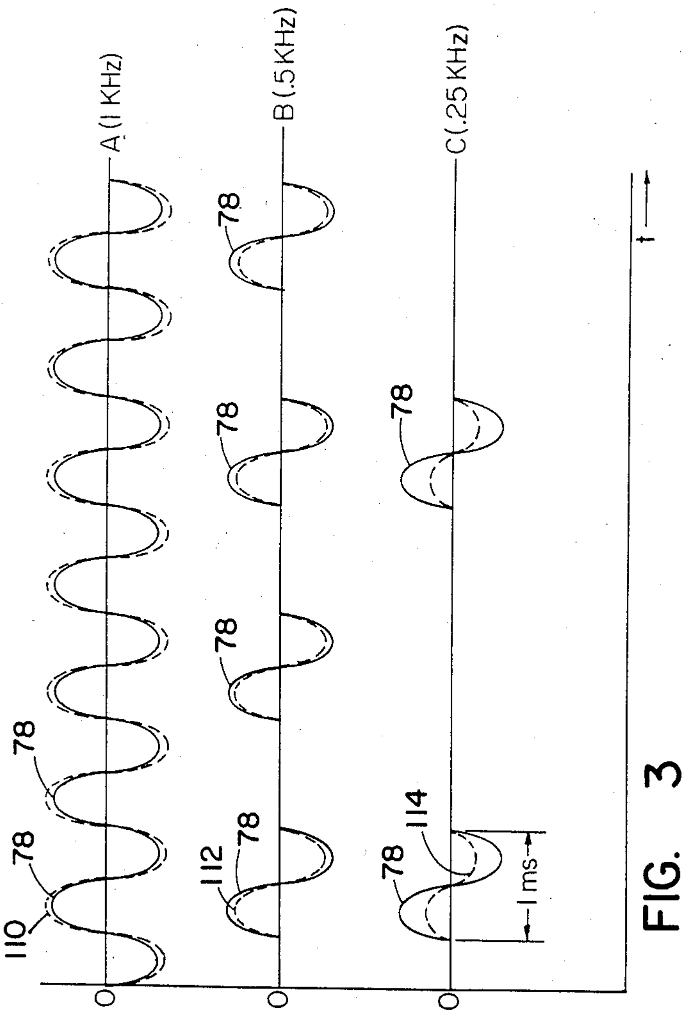
FIG. 3 is a diagram showing representative waveforms produced by the circuit of FIG. 1.

In FIG. 3 fundamental and modified waveforms are shown at A, B and C for different actuating frequencies of the printer head 24. At A in FIG. 3 the waveforms occur at the maximum actuating frequency of 1 KHz in which case successive waveforms join one another to make an apparently continuous wave. With reference to FIG. 2, at this frequency each fundamental waveform 78 is multiplied by a multiplying factor greater than one so as to produce a modified waveform 110 having an amplitude larger than the fundamental waveform 78.

At B in FIG. 3 the fundamental waveforms 78 are created at a frequency of 0.5 KHz. From FIG. 2 it will be noted that at this frequency the multiplying factor is less than one so that the associated modified waveform 112 produced at this frequency has an amplitude less than the amplitude of the fundamental waveform 78.

At C in FIG. 3 the fundamental waveforms 78 are produced at a frequency of 0.25 KHz, and as shown at FIG. 2 at this frequency the multiplying factor is still more less than one than it is at 0.5 KHz so that the resulting modified waveform 112 has an even lower amplitude than the modified waveform 112 resulting at 0.5 KHz.

Figure 4:
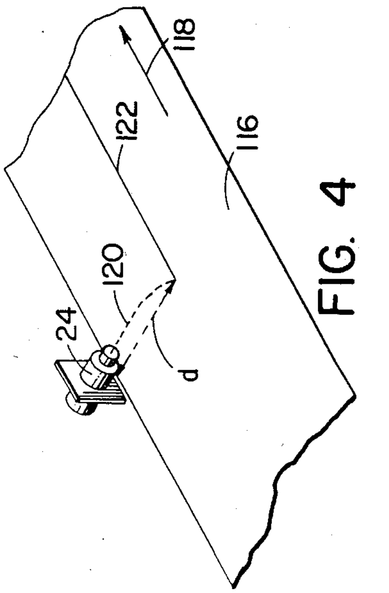
FIG. 4 is a schematic perspective view showing how the velocity of ejected ink drops may be measured in determining the multiplying factors to be used for the circuit of FIG. 1.

FIG. 4 shows a method which may be used to measure the velocity of ink drops ejected from a printer head 24 when selecting the multiplying factors stored in the PROM 80. In this case the printer head 24 is supported horizontally some distance above a horizontally arranged sheet of paper 116. The printer head 24 is actuated at some actuating frequency and the paper 116 moved in the horizontal plane in the direction of the arrow 118 perpendicualr to the trajectory 120 of the ink drops. The distance d between the edge of the paper and the line 122 drawn by the dots is therefore a measure of the drop velocity. The printer head 24 can be driven by a test circuit providing a fundamental waveform similar to the waveform 78, a multiplying factor producing means which can be varied by hand to produce a variable multiplying factor, and a multiplier to multiply the fundamental waveforms by the selected multiplying factor to produce amplitude modified waveforms used to actuate the printer head 24. Therefore, as the printer head 24 is actuated at a given constant frequency and the paper 116 moved in the direction 118, the multiplying factor can be varied by hand until the ink drops strike the paper at a given distance d from the paper edge, and the multiplying factor so obtained can then be loaded into the PROM 64 for that frequency. The test is then run at other actuating frequencies to determine the multiplying factors required at those frequencies to cause the ink dots to strike the paper 16 at the same displacement d and these factors are then also loaded into the PROM 64 to comprise the desired look-up list.

I claim:

1. A circuit for driving an ink jet printer head in response to timing pulses which may appear with variable amounts of time between successive ones of such pulses, said circuit comprising, an ink jet printer head, a source of timing pulses, means for generating a fundamental waveform of finite duration in response to each of said timing pulses, means for multiplying the amplitude of each of said fundamental waveforms to provide a modified amplitude waveform in response to each of said fundamental waveforms, and means utilizing said modified amplitude waveforms to activate said ink jet printer head.

2. A circuit for driving an ink jet printer head as defined in claim 1 further characterized by said means for generating a fundamental waveform of finite duration in response to each of said timing pulses being such that the duration of each of said fundamental waveforms is of a fixed period.

3. A circuit for driving an ink jet printer head as defined in claim 1 further characterized by said means for generating a fundamental waveform of finite duration in response to said timing pulses being such that the duration of each of said fundamental waveforms may be varied.

4. A circuit for driving an ink jet printer head as defined in claim 1 further characterized by said ink jet printer head being one having a piezoelectric activating element, and said means utilizing said modified amplitude waveforms to excite said ink jet printer head being a power amplifier having said modified amplitude waveforms as an input and said piezoelectric activating element connected to its output.

5. A circuit for driving an ink jet printer head as defined in claim 1 further characterized by said means for multiplying the amplitude of each of said fundamental waveforms being such as to multiply said fundamental waveform with a variable multiplying factor the value of which is dependent on the amount of time elapsing between the timing pulse initiating the fundamental waveform in question and the preceding timing pulse.

6. A circuit for driving an ink jet printer head as defined in claim 5 further characterized by said multiplying factor being so related to the time elapsing between successive timing pulses that the velocity of the ink drop ejected by said ink jet printing head in response to each timing pulse remains substantially the same despite changes in the amount of time elapsing between successive timing pulses.

7. A circuit for driving an ink jet printer head as defined in claim 1 further characterized by said means for generating a fundamental waveform in response to each of said timing pulses including a counter, a PROM having its address terminals connected to the data output terminals of said counter, means providing a clock counted by said counter, means for starting said counter upon the appearance of each of said timing pulses, means for stopping said counter when it reaches a predetermined count, and a digital to analog converter connected to the data output terminals of said PROM.

8. A circuit for driving an ink jet printer as defined in claim 7 further characterized by said clock having such a repetition rate that said counter reaches said predetermined count in a time interval no greater than the minimum amount of time elapsing between two successive ones of said timing pulses, and a digital to analog converter connected to the output terminals of said PROM.

9. A circuit for driving an ink jet printer head as defined in claim 7 further characterized by said PROM being programmed so that the fundamental waveform output by said digital to analog converter in response to said counter being counted from its reset condition to its full count condition being substantially a sine wave.

10. A circuit for driving an ink jet printer head as defined in claim 1 further characterized by said means for multiplying the amplitude of each of said fundamental waveforms including a means providing a clock, a counter for counting said clock, a PROM having its address terminal connected to the data output terminals of said counter through a latch, a digital to analog converter connected to the data output terminals of said PROM, means for starting said counter to count said clock upon the appearance of each of said timing pulses, and means for resetting said counter upon the appearance of the next timing pulse.

11. A circuit for driving an ink jet printer head as defined in claim 10 further characterized by means for stopping said second counter upon its reaching a predetermined count.

12. A circuit for driving an ink jet printer head as defined in claim 1 further characterized by said means for generating a fundamental waveform in response to each of said timing pulses including a first counter, a first PROM having its address terminals connected to the data output terminals of said counter, means providing a first clock counted by said first counter, means for starting said counter upon the appearance of each of said timing pulses, means for stopping said counter when it reaches a predetermined count, and a first digital to analog converter connected to the data output terminals of said first PROM, said means for multiplying the amplitude of each of said fundamental waveforms including a means providing a second clock, a second counter for counting said second clock, a second PROM having its address terminal connected to the data output terminals of said second counter through a latch, a second digital to analog converter connected to the data output terminals of said second PROM, means for starting said second counter to count said second clock upon the appearance of each of said timing pulses, and means for resetting said second counter upon the appearance of the next timing pulse.

13. A circuit for driving an ink jet printer head as defined in claim 10 further characterized by means for stopping said counter upon its reaching a predetermined count.

14. A method for producing electrical waveforms for actuating an ink jet printer, said method comprising the steps of producing a series of timing pulses, producing a list of multiplying factors to be used for different elapsed times between successive ones of said timing pulses, in response to each of said timing pulses generating a fundamental voltage waveform, measuring the elapsed time between the timing pulse initiating a fundamental voltage waveform and the preceding timing pulse, deriving from said list the multiplying factor associated with said measured elapsed time, and multiplying said fundamental voltage waveform by said multiplying factor.

* * * * *